United States Patent Office 2,951,740
Patented Sept. 6, 1960

2,951,740
PROCESSING OF NEUTRON-IRRADIATED URANIUM

Horace H. Hopkins, Jr., Richland, Wash., assignor to the United States of America as represented by the United States Atomic Energy Commission No Drawing. Filed July 26, 1957, Ser. No. 674,546

1 Claim. (Cl. 23—14.5)

This invention deals with an improved process of separating and recovering plutonium from neutron-irradiated uranium by solvent extraction.

One of the separation processes in use at the present time comprises the coextraction of the plutonium and uranium values from a nitric acid "feed" solution of the neutron-irradiated uranium with tributyl phosphate leaving the bulk of the fission product values in the aqueous solution, contacting the tributyl phosphate phase thus obtained with an aqueous solution of a reducing agent by which the plutonium originally present in the acid solution in the tetravalent state is reduced to the trivalent state and the trivalent plutonium is taken up by said aqueous "stripping" solution while the uranium values remain in the tributyl phosphate phase. Finally, the uranium values are removed or "back-extracted" from the tributyl phosphate extract phase by contacting the latter with water.

This process, although highly efficient, has certain disadvantages. A comparatively high acidity is required in the aqueous feed solution so that satisfactory plutonium extraction is obtained; this again makes necessary, for economical reasons, acid recovery from the aqueous waste solution. Also, on account of the relatively high acidity, an undesirably great amount of fission products is coextracted with the uranium and plutonium values, in other words, decontamination is not satisfactory; this content of fission products in the uranium—plutonium phase makes the use of a second separation cycle necessary. Since in neutron-irradiated uranium plutonium is always present in comparatively very small amounts (usually not more than one percent of the mass), the extract phase, too, contains a predominant amount of uranium values, and recovery of the small amount of plutonium in pure form is rather difficult. In order to handle the large volume of uranium- and plutonium-containing extract phase, large extraction columns are necessary for further processing.

It is an object of this invention to provide an improved solvent extraction process for the separation of plutonium and/or fission products from uranium by extraction with tributyl phosphate which is free from the disadvantages enumerated above.

It is an object of this invention to provide a solvent extraction process for the separation of plutonium and/or fission products from uranium by extraction with tributyl phosphate which is comparatively simple and inexpensive.

It is another object of this invention to provide a solvent extraction process for the separation of plutonium and/or fission products from uranium by extraction with tributyl phosphate which requires a low acidity in the feed solution so that acid recovery from the aqueous raffinate or waste solution is not necessary.

It is also an object of this invention to provide a solvent extraction process for the separation of plutonium and/or fission products from uranium by extraction with tributyl phosphate in which a very small amount of fission product values is extracted with the uranium values.

It is still another object of this invention to provide a solvent extraction process for the separation of plutonium and/or fission products from uranium by extraction with tributyl phosphate which requires only one uranium extraction cycle.

It is still another object of this invention to provide an improved solvent extraction process for the separation of plutonium and/or fission products from uranium by extraction with tributyl phosphate in which a concentrated slurry of a purified uranium compound is directly obtained in the uranium-isolation step so that a concentration step is not necessary.

Finally it is an object of this invention to provide a solvent extraction process for the separation of plutonium and/or fission product values from uranium values by extraction with tributyl phosphate in which comparatively little uranium is lost to the waste stream.

These objects are accomplished by adjusting the acidity in a nitric acid feed solution of neutron-irradiated uranium fuel material to a concentration of about from 0.3 to 0.5 M; adding a reducing agent for the plutonium to convert the latter to the trivalent state; contacting the solution with tributyl phosphate whereby the uranium values are taken up by a tributyl phosphate phase, while the plutonium and the bulk of the fission product values remain in an aqueous raffinate; separating said aqueous raffinate from the tributyl phosphate phase; adding an oxidizing agent to said aqueous raffinate whereby the plutonium values are converted to the tetravalent state; contacting said aqueous raffinate with tributyl phosphate containing a small amount of dibutyl phosphoric acid whereby the plutonium values are extracted into an organic extract phase while said fission product values remain in an aqueous waste solution; and separating said organic extract phase from said aqueous waste solution.

The following tables summarize the advantages of the new process. Firstly, fewer cycles are required, resulting in equipment savings; the largest saving is the elimination of all stripper concentrators but one. Secondly, with fewer cycles a smaller building and less control equipment are required. Thirdly, the low-acid fission product waste stream need not be concentrated, but is cribbed directly.

SOLVENT EXTRACTION EQUIPMENT COMPARISON—PRESENT AND NEW EXTRACTION PROCESSES

|  | For Decontamination Factor of $10^7$ | |
| --- | --- | --- |
|  | Present | New |
| Extraction Columns | 4 | 3 |
| Scrub Columns | 2 | 3 |
| Strip Columns | 4 | 3 |
| Stripper—Concentrators | 6 | 1 |
| Centrifuges | 0 | 2 |
| Filter | 0 | 1 |
| Total | 16 | 13 |

|  | Cycles for Required Decontamination Factor of $10^7$ | |
| --- | --- | --- |
|  | Present | New |
| Uranium | 3 | 1 |
| Plutonium | 3 | 2 |

| Cycle | Overall Extraction Decontamination Factor Per Cycle ($10^7$ Required) | | | |
|---|---|---|---|---|
| | Present | | New | |
| | U | Pu | U | Pu |
| First | $2\times10^3$ | $2\times10^3$ | $10^7$ | $10^4$ |
| Second | $1\times10^2$ | $1\times10^2$ | | $>10^3$ |
| Third | $>1\times10^2$ | $>1\times10^3$ | | |
| | $>10^7$ | $>10^8$ | $10^7$ | $>10^7$ |

Uranium fuel elements of neutronic reactors are usually enclosed in an aluminum jacket. In order to process the fuel elements by the method of this invention, dejacketing has to be carried out as a preparatory step. This can be done either by chemical means, such as dissolution in sodium nitrate plus sodium hydroxide, or the jacket can be removed by mechanical means. This phase of the process is not part of the invention.

The dejacketed fuel element is then dissolved in nitric acid whereby a so-called dissolver solution is obtained. While this dissolving step has been carried out heretofore at a temperature between 100 and 110° C. at reduced pressure, it has now been found that dissolution at about 130° C. using a pressure of about two atmospheres is more efficient and requires a considerably shorter period of time. For the conventional extraction process with tributyl phosphate the acidity was then adjusted to a concentration of about 2 M; in contradistinction thereto the process of this invention uses an acidity of from 0.3 to 0.5 M whereby certain improvements are accomplished.

The plutonium, which normally is present in a nitric acid solution in the tetravalent state, is then converted to the trivalent state by adding a selective reducing agent so that the uranium is maintained in the hexavalent, extractable state. The preferred reducing agent for this purpose is a ferrous ion-containing substance, for instance, ferrous ammonium sulfate. The reduction may be carried out at room temperature.

The addition of a holding reductant is advisable in order to maintain the reduced plutonium in the trivalent state and to prevent the oxidation of ferrous ions to ferric ions by the nitric acid. Many substances have been found suitable holding reductants when a ferrous salt is used as a reducing agent, namely, urea, formaldehyde, methyl alcohol, ethyl alcohol, hydrazine and sulfamic acid or sulfamates. Hydrazine and sulfamic acid anions are the preferred holding reductants. The most satisfactory combination of reducing agent and holding reductant is a solution containing ferrous sulfamate, because it has the ferrous reducing ion and the sulfamic "holding" ion combined in one substance, and no additional unnecessary ions are then introduced. The concentration of the ferrous sulfamate may range between 0.001 and 0.5 M, the preferred concentration being about 0.03 M.

Tributyl phosphate is preferably used in diluted form, because the tributyl phosphate itself has a density close to that of the feed solution which makes phase separation very difficult and unsatisfactory. Dilution with organic solvents such as they are disclosed in copending applications Serial No. 190,866 filed by James C. Warf on October 18, 1950, granted as U.S. Patent No. 2,883,264 on April 21, 1959, and Serial No. 190,867 filed by Oliver Johnson on October 18, 1950, are suitable.

While the extraction of uranium can be carried out at room temperature (about 25° C.), a slightly elevated temperature, preferably between about 60 and 70° C., has been found advantageous. By extracting from an aqueous solution of low acidity, the extraction of all fission product elements, with the exception of ruthenium, is reduced to a minimum, and by operating at elevated temperature, the ruthenium extraction is markedly suppressed. Thus the combination of heating and low acidity brings about a considerably greater decontamination than had been obtained in the process used heretofore. For instance, decontamination from ruthenium was improved 30-fold by using a temperature of 70° C. and $\beta$- and $\gamma$-decontamination factors were increased up to 100-fold and 40-fold, respectively. (The decontamination factor for uranium from ruthenium, for instance, is $$\frac{\text{amount of Ru in feed} \times \text{amount of U in extract}}{\text{amount of U in feed} \times \text{amount of Ru in extract}}$$

The effect of elevated temperature on the decontamination of feed solution is obvious from the results obtained in two parallel extraction runs carried out under identical conditions with the exception that one run was carried out at 25° C. and the other one at 70° C. Some of the decontamination factors obtained in these two runs are juxtaposed in the table below for the sake of comparison. This table is self-explanatory.

| | Degree of Decontamination | |
|---|---|---|
| | 25° C. | 70° C. |
| $\beta$-counts | 4,900 | 66,000 |
| $\gamma$-counts | 1,900 | 7,900 |
| Ru | 700 | 22,000 |
| Nb | 1,300 | 9,200 |
| Zr | 5,600 | 3,500 |

The following table shows the relative extractability of fission products as a function of acidity and also illustrates the reason for scrubbing ruthenium at high acidity and zirconium and niobium at a lower acidity as will be discussed later.

RELATIVE EXTRACTION INTO TRIBUTYL PHOSPHATE OF FISSION PRODUCTS AS A FUNCTION OF ACIDITY

| $HNO_3$ | 0.5M | 2M | 4M |
|---|---|---|---|
| Zr | 1 | 4 | 25 |
| Nb | 1 | 3 | 15 |
| Ru | 1 | 0.4 | 0.08 |

The tributyl phosphate phase is then separated from the aqueous raffinate. This can be carried out by any means known to those skilled in the art; however, separation by centrifugation was preferred. Of course, if the process is carried out as a continuous countercurrent process using extraction columns, phase separation occurs by settling.

The tributyl phosphate phase is then scrubbed for further decontamination. In the case of extraction columns, which is the preferred equipment for carrying out the invention, scrubbing may either be carried out in the extraction column or it may be performed after phase separation in a separate column; the latter is preferred.

It was found that scrubbing in three stages in separate scrubbing columns yielded the best results, the first scrubbing step being carried out with dilute nitric acid containing ferrous ion to remove plutonium, the second with nitric acid of a concentration, for instance, of from 3.5 to 5 M whereby any coextracted ruthenium is removed from the tributyl phosphate phase, and the third scrubbing stage using water, which in the column results in a dilute nitric acid, for instance, of a concentration between 0.2 and 0.5 M, for back-extraction of any coextracted fission products, in particular of zirconium and niobium; this third scrubbing step also results in the removal of the nitric acid from the tributyl phosphate.

The uranium-containing tributyl phosphate phase is then introduced into the stripping column wherein the uranium is back-extracted or stripped from the tributyl phosphate phase into an aqueous solution. According to this invention, the stripping solution contains a precipitating agent for uranium so that the latter, upon contact with the stripping solution, is immediately precipitated therein in the form of an insoluble compound. Uranium can be precipitated as the peroxide or as the oxalate; the latter is preferred. By this stripping-precipitation step, uranium is recovered in a highly concentrated form, and concentration of a solution by boiling down and denitration of a uranium salt, as is necessary, for instance, when uranium is recovered in the form of uranyl nitrate hexahydrate, are not necessary. Another advantage of this combination step is that the uranium recovery is quantitative and that no additional processing of the uranium fraction is necessary. Furthermore, decontamination is obtained in the precipitation step; as to ruthenium, for instance, a further decontamination factor of about 30 was achieved when the uranium was precipitated as the oxalate.

The aqueous raffinate is processed for separation and recovery of the plutonium by extraction. The plutonium is first oxidized to the tetravalent, tributyl phosphate-extractable state. The preferred oxidizing agent for this purpose is sodium nitrite, which is preferably added in the form of an aqueous solution in a quantity to yield a molarity of from 0.05 to 0.1 M. Also in this step a tributyl phosphate solution is used as the extractant. The addition of a small amount of dibutyl phosphate or similar complexing agent for the plutonium was found to yield improved plutonium extraction. A dibutyl phosphate concentration of 0.03 M in a tributyl phosphate-diluent mixture containing 30 percent by volume of tributyl phosphate gave excellent results. The dibutyl phosphate-complexed plutonium is extracted into an organic extract phase away from the fission products which remain in the aqueous solution, the "waste solution." This step accomplishes a very high degree of decontamination from all fission products except zirconium which is partially extracted.

The organic extract phase is then scrubbed with 0.2 M nitric acid and treated for back-extraction of the plutonium; this has to be carried out under strongly reducing conditions in order to convert the plutonium to the trivalent, preferentially water-soluble form. An aqueous solution of ferrous sulfamate containing nitric acid in a concentration of about 0.5 M, for instance, is satisfactory. This step, in which the plutonium is separated from the organic extract phase in the form of a strip solution, also accomplishes decontamination from the bulk of the zirconium.

For further decontamination from fission products and concentration, the aqueous plutonium strip solution is then subjected to another cycle comprising oxidation with nitrite, extraction into tributyl phosphate, scrubbing with nitric acid of a concentration of about 3 M and stripping with nitric acid of a concentration of 0.2 M or with sulfuric acid of a concentration of about 0.1 M. Part of the aqueous strip solution obtained in this back-extraction step, according to this invention, is then recycled back into the extraction column, whereby, it was found, the solution is not only made more concentrated with respect to the plutonium, but whereby also the decontamination is still furthermore improved. For instance, the fission products of the product solution (relative to plutonium) was ten to thirty times less when ⅞ of the strip solution was recycled into the extraction column. In one run, employing such reflux, a $\gamma$-decontamination factor of $10^5$ was obtained in this cycle.

As previously mentioned, the aqueous raffinate from the first uranium extraction column has a low enough acid content to make an acid recovery step unnecessary. The other solutions, namely, the waste solution from the second plutonium "decontamination cycle," the raffinate from the uranium scrub column, and the supernatant from the uranium precipitation step are combined and subjected to one single acid-recovery step which comprises heating, decomposition of oxalic acid, fractionating, and condensing the volatilized water. The recovered acid from the bottom contains some uranium values and is recycled to the fuel-element dissolver.

In the following an example is given of the process of this invention for illustrative purposes only without the intention to have the invention limited to the details given therein.

*Example*

A neutron-irradiated uranium fuel element weighing 46.38 kg., after removal of the aluminum jacket by mechanical means, is dissolved in 90 l. of a 55-percent nitric acid. The temperature in the dissolver is held at about 130° C., and a superatmospheric pressure of about 2 atmospheres is maintained. The dissolution requires about five hours. After this period the dissolver walls are rinsed with a small amount of water. A total of 97.5 l. of a "dissolver solution" is obtained, 1.96 M in uranyl nitrate, 0.18 M in nitric acid and containing 0.26 g. of plutonium (IV) per liter. To this dissolver solution there is then added 1.5 l. of a 2–M aqueous solution of ferrous sulfamate and subsequently 0.95 l. of a 13–M nitric acid whereby 100 l. of a "feed solution" are obtained 0.3 M in nitric acid, 1.9 M in uranyl nitrate, 0.03 M in ferrous sulfamate and containing 0.25 g. of trivalent plutonium per liter. This feed solution has about 200,000 $\beta$-curies of fission products per ton of uranium and 100,000 $\gamma$-curies or 400 $\beta$-curies/g. plutonium and 200 $\gamma$-curies/g. plutonium.

This feed solution is introduced into an extraction column at about ⅔ of the height from the bottom. At the same time 520 l. of a 30-percent solution of tributyl phosphate in a synthetic aliphatic naphtha of a boiling range of between 201 and 241° C. are introduced near the bottom of the extraction column and 50 l. of an aqueous solution 0.01 M in ferrous sulfamate and 0.5 M in nitric acid near the top of the extraction column. The organic phase which separates at the top of the column is isolated and centrifuged for further phase separation. This phase has been decontaminated from fission products by a factor of 1000 and contains 200 $\gamma$-curies/ton and 100 $\beta$-curies/ton. A total of about 520 l. of tributyl phosphate solution is obtained in which uranyl nitrate is present in a concentration of 0.36 M the nitric acid concentration is 0.02. The aqueous solution in the bottom of the column totaling 150 l. contains uranyl nitrate in a concentration of 0.0005 M, trivalent plutonium in a concentration of 0.167 g./l., ferrous sulfamate in a concentration of 0.02 M and nitric acid in a concentration of 0.27 M.

The plutonium in this aqueous solution is then oxidized to the tetravalent state by adding 14 l. of an aqueous 1.5-M solution of sodium nitrite. The 164 l. of aqueous solution thus obtained are introduced into an extraction column, near its top, and 50 l. of a 30-percent tributyl phosphate—naphtha solution containing dibutyl phosphate in a concentration of 0.03 M are introduced near the bottom of said plutonium extraction column. A waste solution (194 l.) containing the bulk of the fission products and less than 0.1 percent each of uranium and plutonium are obtained.

The organic extract phase into which the plutonium has been extracted contains plutonium dibutyl phosphate in a concentration of 0.0021 M, dibutyl phosphate in a concentration of 0.011 M, nitric acid in a concentration of 0.02 M and 20 $\beta$- and 20 $\gamma$-curies of fission products per gram of plutonium. The bulk of this fission products activity is zirconium. This organic extract phase, which has a volume of 50 l., is then scrubbed in a column using 20 l. of a 0.2-M nitric acid, and the aqueous phase is returned to the extraction column. At this point the bulk of the fission products with the plutonium is still zirconium activity.

The thus scrubbed organic extract phase is then introduced into a column, the strip column, for back-extraction of the plutonium. For this purpose the organic solution is contacted with 10 l. of an aqueous solution 0.5 M in nitric acid and 0.05 M in ferrous sulfamate. A temperature of 30 to 50° C. is used for this step to increase the rate of reaction. The plutonium is back-extracted thereby into these 10 l. of aqueous solution and is then present therein in a concentration of 0.01 M. This back-extraction performs considerable decontamination from zirconium, and the resulting product solution contains 0.02 curies of fission products activity. This represents an overall decontamination factor of 2000.

These 10 l. of the strip solution are then subjected to another extraction cycle for further decontamination and concentration. For this purpose 1.6 l. of a 1.5-M sodium nitrite solution and 7.4 l. of a 13-M nitric acid solution are added to the aqueous solution; 19 l. of a solution are formed thereby containing the plutonium in the tetravalent state in a concentration of 1.3 g./l. and nitric acid in a concentration of 5.2 M. This solution is contacted in an extraction column with 4.75 l. of a 30-percent tributyl phosphate solution, and the organic plutonium solution obtained thereby is then scrubbed with a solution containing 1.5 l. of a 3-M nitric acid plus the aqueous phase returned from the stripping column.

The organic plutonium solution is then introduced into another column for stripping. This is accomplished by contacting it countercurrently with 2.4 l. of a 0.1-M sulfuric acid whereby a plutonium solution is obtained which contains 81 g./l. of plutonium, nitric acid in a concentration of 0.5 M and sulfuric acid in a concentration of 0.1 M.

A volume of 0.305 l. of this solution is removed as product solution, while 2.1 l. are recycled into the extraction column in which the aqueous plutonium solution is extracted with tributyl phosphate. The product solution at this step has been very highly decontaminated and contains less than $1 \times 10^{-5}$ fission product curies per gram of plutonium, representing an overall plutonium decontamination factor of $2 \times 10^7$ or greater.

The 520 l. of uranium solution that were obtained in the first extraction step with tributyl phosphate are treated for purification and precipitation of the uranium. For this purpose the tributyl phosphate solution is successively washed, in separate columns, with nitric acid and with water whereby some of the extracted fission products are back-extracted; ruthenium is removed in the acid scrub, and zirconium in the water scrub. The organic phase then contains 0.1 curies of fission products per ton of uranium. Thereafter the solution is heated to a temperature of 60° C. and contacted in a column with 340 l. of an oxalic acid solution of 60° C. and a concentration of 0.55 M. A precipitate of uranyl oxalate forms in the aqueous solution. The slurry obtained at the bottom of the column is 0.04 M in uranyl oxalate, 0.05 M in oxalic acid and 1.0 M in nitric acid. The aqueous slurry is filtered, and the precipitate is dried in a drier. The uranyl oxalate precipitate represents a yield of 83 percent of the initial uranium. The balance is recovered by carrying the aqueous solution through an acid-concentration step and returning it to the dissolver. This precipitation accomplishes an additional ten-fold decontamination so that the final product has 0.01 curies fission products per ton uranium, representing an over-all uranium decontamination factor of $10^7$.

It will be understood that this invention is not to be limited to the details given herein, but that it may be modified within the scope of the appended claim.

What is claimed is:

A process of recovering plutonium values from an aqueous nitric acid solution containing said plutonium values together with fission product values including ruthenium values in comparatively small concentrations and uranium values in a greatly predominant concentration, comprising adjusting the acidity of said solution to a concentration of between 0.3 and 0.5 M; adding ferrous sulfamate to said solution whereby the plutonium values are selectively converted to the trivalent state; heating the solution to from 60 to 70° C.; contacting the solution while maintaining said elevated temperature with a tributyl phosphate-hydrocarbon mixture whereby said uranium values and part of said ruthenium values are taken up by a tributyl phosphate phase while said plutonium and fission product values are retained in an aqueous raffinate; separating said aqueous raffinate from said tributyl phosphate phase; scrubbing said tributyl phosphate phase with an 0.5 M nitric acid containing ferrous sulfamate whereby any coextracted plutonium values are back-extracted from said tributyl phosphate phase; scrubbing said tributyl phosphate phase with nitric acid of a concentration between 3.5 and 5 M whereby coextracted ruthenium values are back-extracted from said tributyl phosphate phase; scrubbing said tributyl phosphate phase with water whereby any remaining coextracted fission product values and extracted nitric acid are back-extracted and a purified tributyl phosphate solution of uranium is obtained; contacting said tributyl phosphate phase with an aqueous solution of oxalic acid whereby uranyl oxalate precipitates; separating the precipitate formed from the liquid phases formed; adding sodium nitrite to said raffinate whereby said plutonium values are converted to the tetravalent state; contacting said raffinate with tributyl phosphate containing a small concentration of dibutyl phosphate, whereby said plutonium values are taken up by an organic extract phase while said fission product values remain in an aqueous waste solution; separating the organic extract phase from the aqueous waste solution; contacting the organic extract phase with an aqueous nitric acid solution of ferrous sulfamate whereby an aqueous solution containing the plutonium in the trivalent state is obtained; reoxidizing said plutonium solution with sodium nitrite, acidifying said solution with nitric acid, contacting said soluton with tributyl phosphate whereby a second tributyl phosphate phase is formed, reextracting the plutonium values with dilute acid whereby an aqueous product solution is formed, and cycling a fraction of said product solution back into the organic extract phase for further decontamination.

References Cited in the file of this patent

UNITED STATES PATENTS

| | | |
|---|---|---|
| 2,833,616 | Voiland | May 6, 1958 |
| 2,847,276 | Butler | Aug. 12, 1958 |
| 2,848,300 | Warf | Aug. 19, 1958 |
| 2,849,277 | Thomas | Aug. 26, 1958 |

OTHER REFERENCES

Bruce et al.: "Progress in Nuclear Energy" Series III, Process Chemistry, pages 105–121, 126–129, 140–146 (1956), McGraw-Hill Book Co., NYC. (Copy in Sci. Lib., TK 9350 B 7.)

Irish; "Symposium on the Reprocessing of Irradiated Fuels," TID–7534, pages 83–106. Held at Brussels, Belgium, May 20–25, 1957. (Copy in Sci. Library, TK 9360 S 92.)

Goldschmidt et al.: "Int. Conf. on the Peaceful Uses of Atomic Energy," vol. 9 pp. 492–497, Aug. 1955, U.N. Publication, New York. (Copy in Scientific Library.)